S. M. McCANDLESS & F. G. McPHERSON.
SHAMPOOING STAND.
APPLICATION FILED JAN. 8, 1914.
1,228,122.
Patented May 29, 1917.
4 SHEETS—SHEET 3.
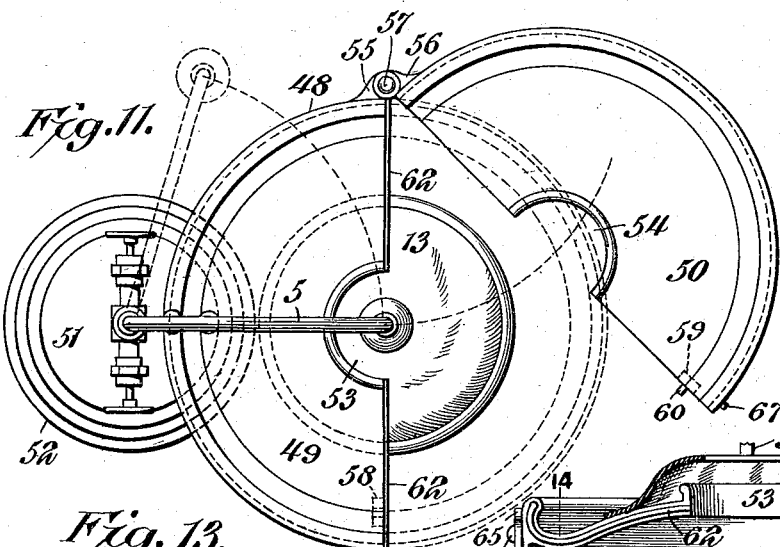
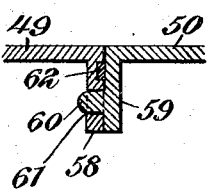
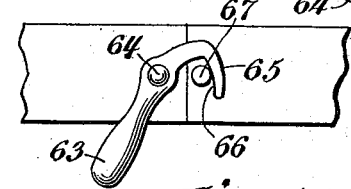
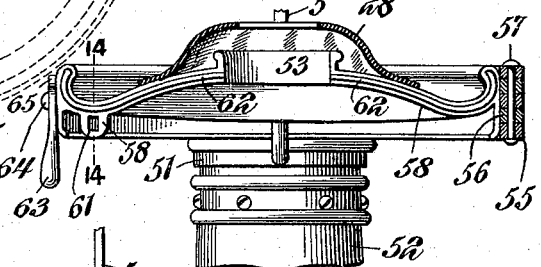
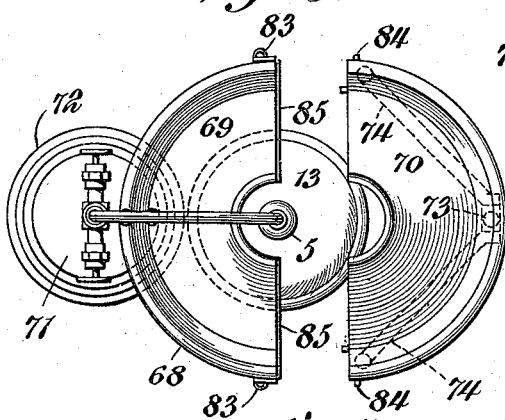
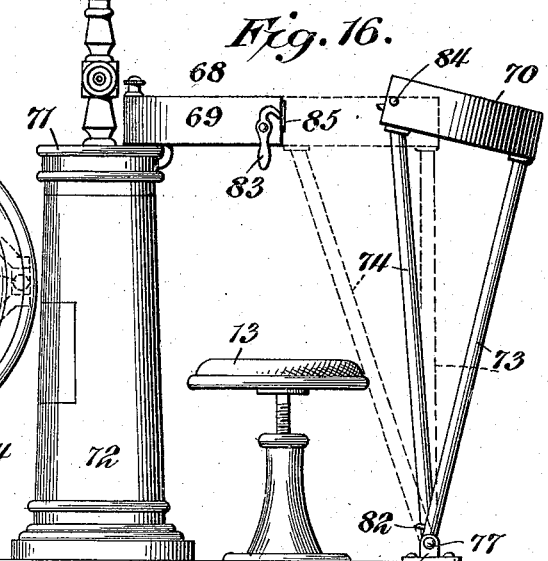

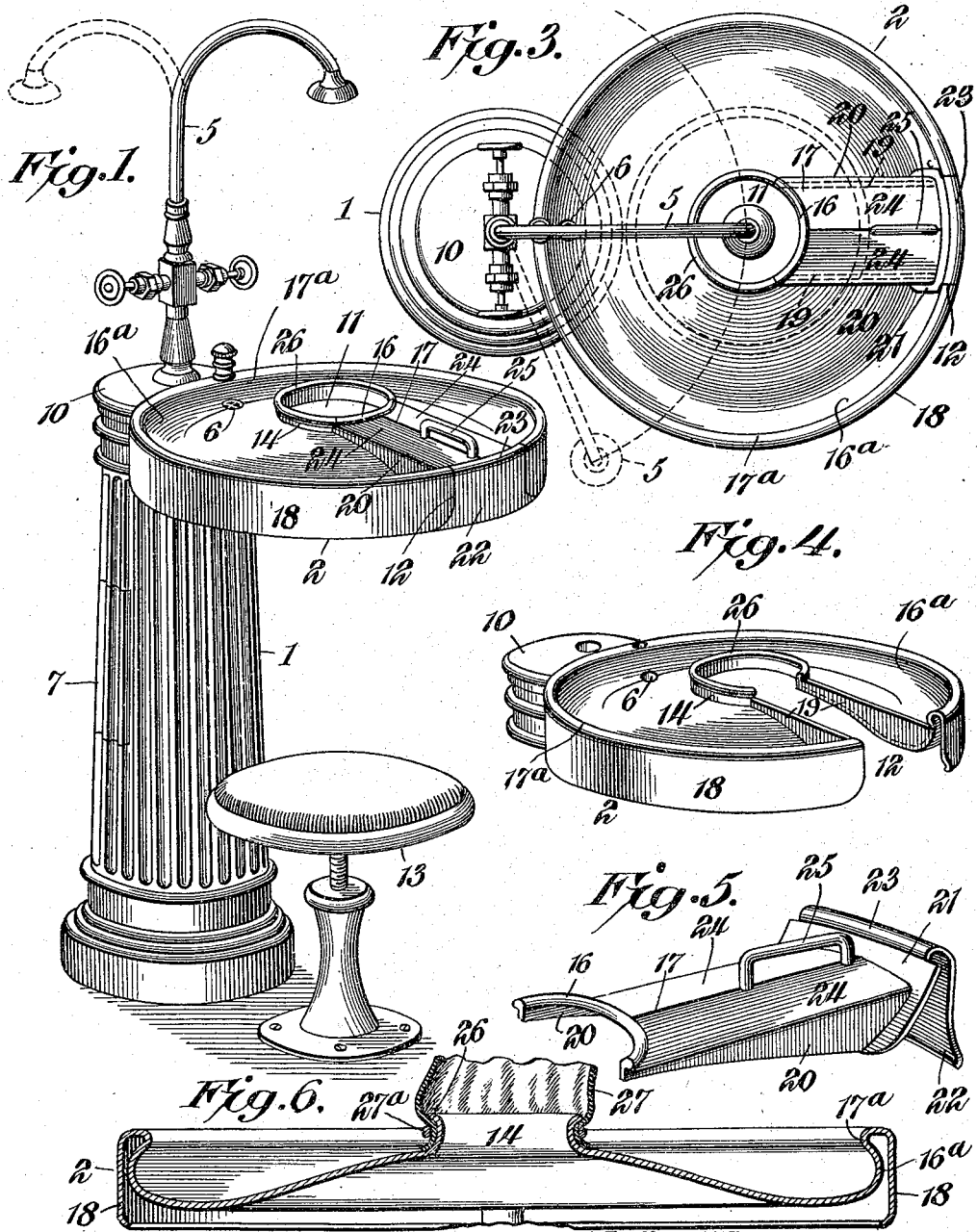

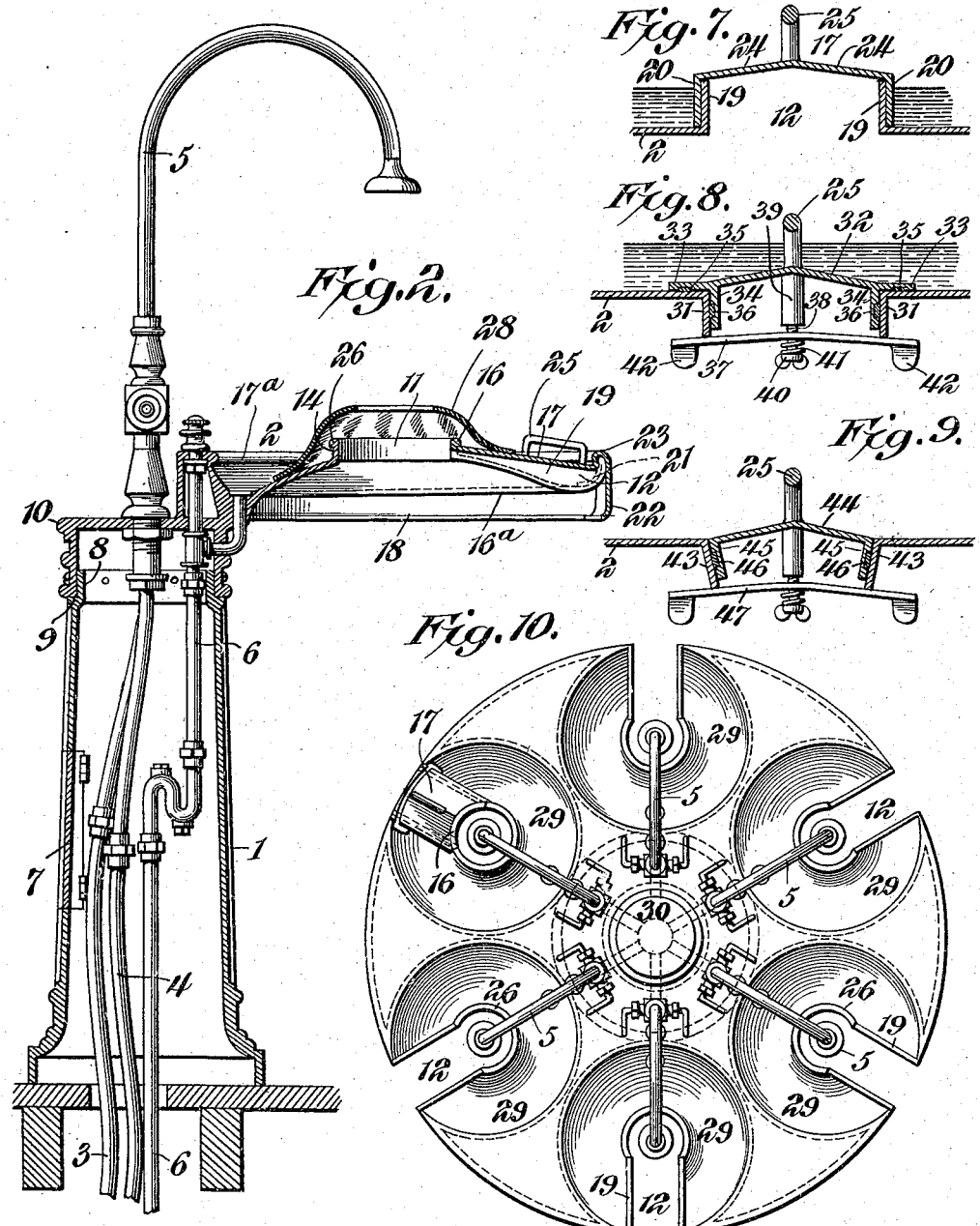

S. M. McCANDLESS & F. G. McPHERSON.
SHAMPOOING STAND.
APPLICATION FILED JAN. 8, 1914.
1,228,122.
Patented May 29, 1917.
4 SHEETS—SHEET 4.
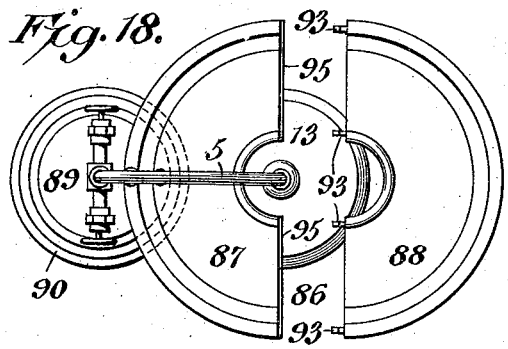
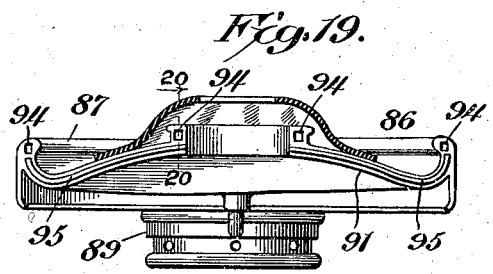
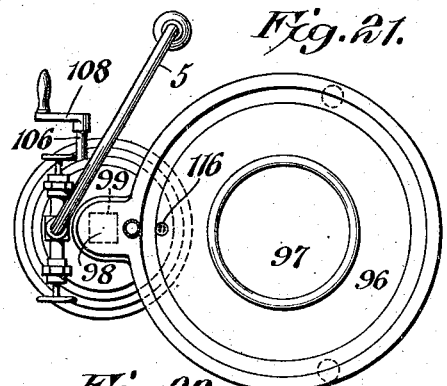
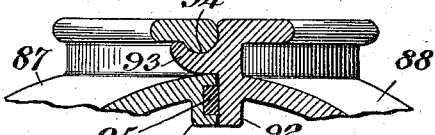
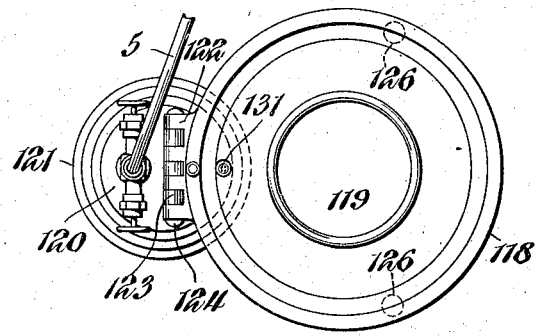
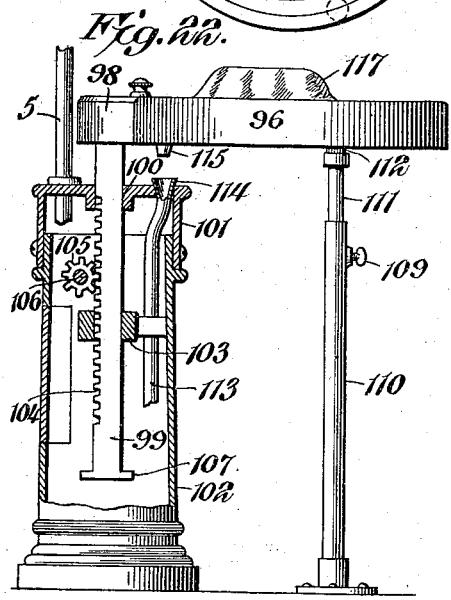
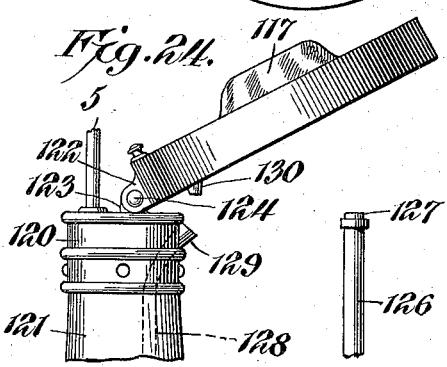
WITNESSES
Howard D. Orr
H. F. Riley
S. M. McCandless
and F. G. McPherson, INVENTORS,
BY
C. G. Siggers
ATTORNEY

UNITED STATES PATENT OFFICE.

SYLVESTER M. McCANDLESS AND FRANK G. McPHERSON, OF BEAVER FALLS, PENNSYLVANIA.

SHAMPOOING-STAND.

1,228,122.  Specification of Letters Patent.  Patented May 29, 1917.

Application filed January 8, 1914. Serial No. 811,089.

*To all whom it may concern:*

Be it known that we, SYLVESTER M. McCANDLESS and FRANK G. McPHERSON, citizens of the United States, residing at Beaver Falls, in the county of Beaver and State of Pennsylvania, have invented a new and useful Shampooing-Stand, of which the following is a specification.

The invention relates to a shampooing stand.

The object of the present invention is to improve the construction of shampooing apparatus, and to provide a simple, practical and ornamental shampooing stand equipped with an overhead shower and a basin so constructed as to permit the head of a person to be arranged directly over it and under the shower and completely exposed to the same and to the operator while the person operated on is occupying a comfortable sitting position, whereby the head of the person may be rapidly, thoroughly and agreeably shampooed and washed and rinsed without necessitating any change of position. A further object of the invention is to provide a shampooing stand of this character provided with means for affording a perfect water tight connection between the neck of the person and the basin, whereby all liability of wetting or soiling the clothes will be entirely eliminated.

With these and other objects in view, the invention consists in the construction and novel combination of parts hereinafter fully described, illustrated in the accompanying drawings, and pointed out in the claims hereto appended; it being understood that various changes in the form, propor40 tion, size and minor details of construction, within the scope of the claims, may be resorted to without departing from the spirit or sacrificing any of the advantages of the invention.

In the drawings:—

Figure 1 is a perspective view of a shampooing stand, constructed in accordance with this invention.

Fig. 2 is a central vertical sectional view of the same.

Fig. 3 is a plan view of the shampooing stand.

Fig. 4 is a perspective view of the basin, the detachable section or closure of the entrance opening being removed.

Fig. 5 is a detail perspective view of the removable section or closure of the basin.

Fig. 6 is a vertical sectional view of the basin, illustrating the manner of securing the bib to the collar or neck receiving flange when the stand is to be used for operating on ladies' hair.

Fig. 7 is a detail sectional view, taken transversely of the removable section or closure.

Figs. 8 and 9 are similar views, showing other forms of closures.

Fig. 10 is a plan view of a shampooing stand having a cluster of basins and showers.

Fig. 11 is a plan view of a shampooing stand, illustrating another form of the invention in which the basin is provided with a hinged section adapted to open to permit the introduction of the neck of the person into the central opening of the basin.

Fig. 12 is a transverse sectional view of the same, parts being omitted.

Fig. 13 is a detail view of the locking device for securing the hinged section in its closed position.

Fig. 14 is a detail sectional view on the line 14—14 of Fig. 12.

Fig. 15 is a plan view of a shampooing stand showing another form of invention in which the basin is provided with a hingedly mounted section adapted to swing outwardly and inwardly to permit a person to be placed in position.

Fig. 16 is a side elevation of the same.

Fig. 17 is a detail view of the lower portion of the supporting leg of the movable section of the basin.

Fig. 18 is a plan view of a shampooing stand provided with a basin having a detachable section.

Fig. 19 is a front elevation of the fixed section of the basin, the bib being shown in section.

Fig. 20 is a detail sectional view on the line 20—20 of Fig. 19, illustrating the construction for locking the detachable section of the basin with the fixed section of the same.

Fig. 21 is a plan view of a stand having a vertically slidable basin.

Fig. 22 is a side elevation of the same, the pedestal being in section.

Fig. 23 is a plan view of a shampooing stand, the basin being hinged to swing upwardly and downwardly.

Fig. 24 is a side elevation of the same.

Like numerals of reference designate corresponding parts in all the figures of the drawings.

The drawings disclose various embodiments of the invention while the claims define the scope of the same.

Referring to the accompanying drawings, 1 designates a hollow pedestal forming a support for a basin 2 and containing hot and cold water pipes 3 and 4 of a shower 5 and a waste pipe 6, which is connected with the basin. The basin and the pedestal may be constructed of enameled iron, copper, zinc, pressed steel, or any other suitable material and the plumbing accessories may be of any preferred form. The pedestal 1 is preferably provided at the back with a door 7 to afford access to the entire plumbing, and the shower 5, which curves inwardly and downwardly and terminates at a point above the center of the basin, is swiveled to enable it to be swung to one side to a position beyond the vertical plane of the basin, as illustrated in Figs. 1 and 3 of the drawings, or to arrange the discharge nozzle at a point between the center and the outer wall of the basin to avoid turning off the water after the same has been properly tempered and it is desired to retain the water in such condition. Any other desired form of shampooing fixture may be substituted for the shower illustrated in the drawings. The upper end 8 of the pedestal is preferably reduced to form a shoulder 9 for supporting a pedestal cap 10 formed integral with or otherwise rigidly connected to the basin and fitted on the reduced upper end 8 of the pedestal and secured to the same by screws or other suitable fastening devices.

The basin, which may be of circular, oval, rectangular or any other form, is provided with a central neck receiving opening 11, and in the forms of the invention illustrated in Figs. 1 to 10 inclusive, the basin has an entrance opening 12 extending from the central opening to the outer wall of the basin to permit the neck of a person to pass through the entrance opening to the central opening so as to arrange the head above the center of the basin. The entrance opening preferably extends to the front of the basin and a person in the act of sitting upon the stool 13 will naturally bend forwardly and in straightening up will easily carry his neck rearwardly through the entrance opening into the central opening. The central neck receiving opening is surrounded by an upwardly extending inner wall or collar flange 14 preferably formed integral with the basin and terminating at opposite sides of the entrance opening and completed by an inner curved flange 16 of a removable closure 17, which fits over and covers the entrance opening 12. The basin has a fall from front to rear to turn the water to the drain or waste pipe, and the bottom portion of the basin slopes downwardly and outwardly from the collar flange to a point intermediate of the same and the outer wall 16$^a$, which is interiorly concaved, as clearly shown in Fig. 6 of the drawings, and is provided at the upper edge with an inwardly projecting bead or overhanging portion 17$^a$. This construction is adapted to prevent water from the shower from splashing outwardly beyond the outer wall of the basin, the said outer wall being adapted to turn any outflowing water upwardly and inwardly. The outer wall of the basin at the bead is rolled over outwardly and extended to form a depending apron 18. The basin forms an intervening trough located between the inner wall or flange and the outer wall and surrounding the neck receiving opening, and the said basin is provided in the form of the invention illustrated in Figs. 1 to 7 inclusive with transverse walls 19, located at opposite sides of the entrance opening 12 and forming end walls for the said trough of the basin. The apron 18 is cut away and rounded at opposite sides of the entrance opening 12, and the closure 17, which is provided at opposite sides with flanges 20 to fit the upwardly extending walls 19, is provided at the outer end with a walled section or flange 21 and an apron flange 22 conforming, respectively, to the configuration of the outer wall 16 and the apron 18 of the basin and connected at the top by a bead 23, which is of the same shape as the bead at the top of the wall 16. The outer portion of the closure completes the wall 16 and the apron 18 of the basin and is arranged in flush relation with the same, as clearly illustrated in Figs. 1 and 3 of the drawings. The closure 17 arches the entrance opening and is oppositely inclined at 24 to shed water and is equipped with a suitable handle 25 to enable it to be conveniently placed on and lifted from the basin. The side flanges 20 are adapted to closely embrace the transverse walls 19 and as the latter extend above the water, as illustrated in Fig. 7 when the basin is full, there is no liability of leakage at the entrance opening.

The central collar, which surrounds the neck receiving opening, is preferably concave to present a smooth rounded inner face to the neck of a person and to provide an outwardly projecting or overhanging upper edge or rib 26, adapted to enable a flexible bib 27 to be securely fastened at the bottom to the collar by a cord 27ª or other suitable fastening means to provide a water tight closure, as clearly illustrated in Fig. 6 of the drawings. This will be found advantageous when shampooing ladies' hair, but is not necessary when shampooing men's heads, as a bib 28 having an outwardly flared or extended bottom portion adapted to lie upon the inclined surface of the raised central portion of the basin may be employed. Also when the shampooing stand is constructed solely for shampooing men's heads, the collar flange may be made plain at the outer face by omitting the outwardly projecting upper edge or rib 26. The bib 28 is constructed of a single piece of rubber or other elastic material and is adapted to be stretched over the head of a person and removed therefrom in a similar manner. The flexible bib may be constructed of any other suitable water proof material, and it may consist of a single strip of material adapted to be wrapped around the neck of a person and around the collar flange of the basin. The stool 13 for the accommodation of the person has an adjustable seat and is located directly beneath the center of the basin. Any other form of seat, however, may, of course, be employed. When a person is in position, the head is directly above the center of the basin and is completely exposed to the operator and to the shower, which may be moved out of the way of the operator if desirable.

Instead of constructing the stand with a single basin, as shown in Fig. 1, it may be equipped with a cluster of basins 29, as illustrated in Fig. 10 of the drawings, and the stand may then be conveniently surmounted by a central cabinet 30 to form a convenient receptacle for shampooing requisites. The cluster of basins is shown in Fig. 10 in circular form, but any other form of stand having any desired number of basins may, of course, be employed.

In Fig. 8 is illustrated another form of invention in which the basin at the entrance opening is provided with depending side flanges 31 and is equipped with a closure 32 having its side portions 33 resting upon and arranged substantially flush with the bottom of the basin and provided at the said side portions with depending flanges 34, fitting between the side flanges 31. The side portions 33 are provided at their lower faces with strips 35 of rubber and the depending flanges 34 are equipped at their outer faces with similar packing strips 36. The packing strips 35 and 36, which are seated in grooves of the closure 32, may be constructed of any suitable packing material and they form a water tight joint and at the same time render the closure 32 noiseless. The closure 32 is retained in tight engagement with the basin by means of a locking bar 37 pivotally mounted on a vertically disposed threaded stem 38, fixed to and extending downwardly from a stud 39 depending from the central portion of the closure 32. The threaded stem receives an adjusting nut 40 adapted to vary the tension of a coiled spring 41, disposed on the stem and interposed between the nut and the lower face of the locking bar through which the threaded stem 38 passes. The locking bar is provided at its ends with depending projecting lips 42 to enable it to be readily turned into and out of engagement with the depending side flanges 31 of the basin, and it extends across the space between the side flanges 31 and projects slightly beyond the same when in engagement with the said side flanges 31. When the locking bar is turned longitudinally of the closure to a position at right angles to that illustrated in Fig. 8, it releases the closure and enables the same to be readily removed from the basin. The spring yieldably maintains the closure with its packing strips in tight engagement with the said basin and leakage is effectually prevented.

In Fig. 9 of the drawings, the basin is equipped with downwardly converging side flanges 43, and the closure 44 is provided at its side edges with depending downwardly converging side flanges 45 fitting snugly between the side flanges 43 of the basin. The side flanges of the closure are provided with packing strips 46 seated in longitudinal grooves of the side flanges 45 and adapted to form a tight water connection between the basin and the closure, the upper face of which is arranged in flush relation with the basin. The closure 44 is equipped with a pivoted locking bar 47, constructed, arranged and operating similar to the locking bar 37 heretofore described.

In Figs. 11 to 14 inclusive is illustrated another form of invention in which the shampooing stand is equipped with a basin 48 composed of a stationary section 49 and a hinged section 50, preferably formed by dividing the basin diametrically. The stationary section 49 is provided with an integral pedestal cap 51 constructed similar to the pedestal cap heretofore described and secured in the same manner upon the upper end of a pedestal 52, which is also constructed similar to the pedestal 1. The basin 48 is of the same general configuration as the basin 2, and it is provided with a central neck receiving opening formed by centrally arranged semicircular recesses 53 and 54 of the sections 49 and 50. The basin is preferably divided transversely to form the sections 49 and 50, and the latter are provided at one side of the basin with alined ears 55 and 56 connected by a vertical pintle 57 on which the section 50 is adapted to swing in a horizontal direction in opening and closing the basin to permit the neck of a person to be arranged within and removed from the central opening of the basin. The sections 49 and 50 are provided at their meeting edges with depending abutting flanges 58 and 59, and the hinged section 50 is supported at the side opposite that at which the sections are hinged by means of a lug 60 preferably formed integral with the flange 59 and extending into a socket or opening 61 in the flange 58 when the said hinged section 50 is closed. One of the flanges, preferably the flange 58, is provided with longitudinal packing strips 62, extending from the central neck receiving opening to the bead of the outer wall and adapted to form water tight connections when the hinged section is closed. Both sections may, of course, be provided with packing strips if desired, and the hinged section is locked in its closed position by means of a fastening device consisting of a lever 63, pivoted by a pin 64 or other suitable fastening device to the apron of the stationary section 49 and provided with a curved bill or engaging portion 65, forming an inner cam edge or face 66 adapted to engage with a projection 67, fixed to the apron of the hinged section 50 of the basin. The handle portion of the lever projects below the basin to enable it to be readily grasped by the operator, but any other suitable fastening device may, of course, be employed for locking the sections in their closed position. The cam lever is especially advantageous as it is adapted to draw the two sections into tight engagement and to compress the elastic packing strips 62 to secure a water tight connection. The shower and the plumbing in this form of the invention is the same in structure and arrangement as that heretofore described.

In Figs. 15 to 17 inclusive is illustrated another form of the invention in which the stand is equipped with a basin 68, composed of a stationary section 69 and a movable section 70, the sections being semicircular and constructed substantially the same as the sections 49 and 50 with the exception that the movable section 70 is carried entirely away from the stationary section 68 in opening the basin to permit the neck of a person to be introduced into and removed from the central opening of the basin. The stationary section 68 is equipped with a pedestal cap 71, which is suitably secured upon the upper end of a pedestal 72, and the movable section 70 is supported by a hinged leg preferably composed of tubular rods 73 and 74 suitably fixed at their upper ends to the basin. The rods 74 converge downwardly and outwardly from opposite sides of the section 70 and have their lower ends located at opposite sides of the lower end of the rod 73. The lower ends of the rods 73 and 74 are provided with alined sleeves 75 and 76 arranged on a transverse pivot 77, which is mounted in ears 78 of angle plates or brackets 79 suitably secured to the floor or other supporting surface. The side sleeves 76 are provided with projecting lugs 80, arranged to contact with the floor to limit the outward or opening movement of the section 70 of the basin, and the said section 70 when unlocked is automatically swung outward by a spring 81 consisting of a central loop 82 and side coils, which are arranged on the sleeves 75 and 76 at the adjacent ends thereof. The loop embraces the inner side of the central rod 73 and the terminals of the spring bear against the floor. The tension of the spring increases as the section 70 moves inwardly, and the said section is locked in its closed position by cam levers 83, constructed similar to the cam lever 63 and pivotally mounted on the fixed section 69 at opposite sides thereof and adapted to engage projections 84 carried by the movable section 70 of the basin. The stationary section 69 of the basin is provided with packing strips 85, constructed and arranged similar to the packing strips 62. The shower and plumbing in this form of the invention is also the same as that heretofore described.

In Figs. 18 to 20 inclusive of the drawings is illustrated the shampooing stand having the basin 86 composed of a stationary section 87 and a detachable section 88, adapted to be entirely removed from the stationary section to open and close the basin. The stationary section is provided with a pedestal cap 89, which is mounted upon a pedestal 90 in the manner heretofore described. The sections 87 and 88 are provided at opposite sides of the central neck receiving opening of the basin with depending flanges 91 and 92, and the detachable section 88 is interlocked with the stationary section 87 by means of hook-shaped lugs 93 arranged in pairs and located at the ends of the flanges 92 and adapted to engage in sockets 94 formed in the stationary section at the inner and outer ends of the flanges 91, which are provided with longitudinal packing strips 95. The packing strips 95 are located below the plane of the sockets and the coacting hook-shaped lugs, and the inward pressure of the lower portions of the flanges 92 incident to the weight of the detachable section is adapted to compress the packing strips and maintain a water tight connection between the sections of the basin. The plumbing and the shower in this form of the invention is also similar to that heretofore described.

In Figs. 21 and 22 is illustrated a shampooing stand having a vertically slidable basin 96 provided with an enlarged central neck receiving opening 97 of sufficient size to permit the head of a person to pass through it. The basin is provided at the back with an integral cap 98 in which is secured the upper end of a vertically movable standard 99 slidable in an upper opening 100 in the cap 101 of a pedestal 102, and in a lower guide 103 having an opening in vertical alinement with the opening 100 of the pedestal cap 101. The guide 103 may be of any desired construction, and it preferably consists of a rigid arm located within and extending horizontally from the front side or wall of the pedestal. The standard is provided at its rear face with teeth 104 forming a rack and meshing with a pinion 105 suitably fixed to a horizontal shaft 106 and adapted to be rotated to raise and lower the standard 99 and the basin carried thereby. The standard is provided at its lower end with an enlargement 107 forming a stop and adapted to engage the guide 103 to limit the upward movement of the standard. The horizontal shaft 106, which is journaled in suitable bearings of the pedestal, is provided at its upper end with a crank handle 108 or other suitable operating device. Any suitable means may be provided for locking the shaft against rotary movement if desired, but the basin is adapted to be supported in an elevated position by set screws 109, mounted in threaded perforations of tubular legs 110 and adapted to engage telescopic sections 111 secured to the basin and slidable upwardly and downwardly, the tubular legs forming guides for the sections 111 and the set screws being adapted to engage and clamp the sections and the basin in its adjustment. The legs, which are suitably secured to the floor or other supporting surface, are preferably located at opposite sides of the basin, and the telescopic sections, which may be constructed of tubular metal or other material, are provided at their upper ends with cushions 112, constructed of rubber or other suitable material and adapted to contact with and rest upon the ends of the legs 110. The cushions are adapted to render the shampooing stand noiseless.

The shower and the hot and cold water pipes are designed to be constructed and arranged similar to those heretofore described, but the pedestal is equipped with a drain or waste pipe 113 having a downwardly tapered vertically disposed socket 114 arranged at the top of the pedestal in the path of a tapered nipple 115 depending from the basin at the drain opening 116 thereof and adapted to fit tightly in the socket 114 to form a water tight connection between the basin and the drain or waste pipe when the basin is in its lowermost position. The detachable coupling formed by the socket is designed to be provided with a gasket of rubber or other suitable material.

In this form of shampooing stand, the person is placed beneath the basin when the latter is in an elevated position and the basin is then lowered so as to surround the neck of the person. An enlarged bib 117 is employed and as the configuration of the basin 96 is substantially the same as that shown in Fig. 1, a bib may be arranged upon the bottom of the basin when a man's head is to be shampooed, or be fastened around the collar when shampooing a lady's hair.

In Figs. 23 and 24 is illustrated a basin 118 having an enlarged opening 119 and adapted to be swung upwardly and downwardly to enable it to be conveniently passed over the head of a person, the opening 119 being of sufficient size to permit the person's head to pass through it. The basin, which is hinged at the cap 120 of a pedestal 121, is provided at the back with a plurality of alined perforated lugs or ears 122 registering with perforated ears or lugs 123 of the pedestal cap 120 and connected therewith by a pintle 124 on which the basin 118 swings. The front portion of the basin is preferably supported by legs 126 suitably mounted on the floor or other supporting surface and located at opposite sides of the front portion of the basin and provided at their upper ends with cushions 127 to render the basin noiseless. The shower and the hot and cold water pipes are of the same construction as those heretofore described, but the drain pipe 128 is provided at its upper end with an inclined downwardly tapered socket 129, projecting exteriorly of the pedestal cap and arranged to receive a nipple 130 depending from the basin 118 at the drain opening 131 thereof. The nipple is set at an inclination and is adapted to enter the tapered socket 129 and form a tight joint or connection when the basin is swung downwardly to a horizontal position and rests upon the supporting legs. The detachable or separate coupling formed by the socket 129 and nipple 130 is designed in practice to be provided with a suitable gasket, and the basin is equipped with an enlarged bib 117.

What is claimed is:—

1. A shampooing stand comprising a basin with a central opening therethrough to accommodate the neck of a person seated beneath the basin, and a single pedestal for inclosing water supply and drain pipes for the basin and supporting and connected to the basin wholly at one side of the latter, the overhang of the basin from the pedestal being such as to cover the shoulders of a person seated beneath the basin with the head above the latter and the neck passing through the central opening of the basin and with the head of the person so located wholly above the highest point of the basin.

2. A shampooing stand comprising a single upstanding pedestal for inclosing water supply and drain pipes, and a basin at the top of and fixed to the pedestal and offstanding therefrom to approximately the full diameter of the basin, said basin having a central upright opening therethrough for the passage of the neck of a person seated beneath the basin, with the diameter of the basin sufficient to extend over the shoulders of a person so seated, and the height of the sides of the basin being approximately the same as the height of the neck-surrounding opening, whereby the head of a person so seated is wholly exposed above the basin.

3. A shampooing stand comprising a single upstanding pedestal for inclosing supply and drain pipes for water, and a basin with a central upright passage therethrough for the neck of the person to be treated, and with fastening and sustaining means at one edge of the basin in coactive relation to the pedestal and supporting the basin in offstanding relation to the pedestal with substantially all of the basin projecting to one side of said pedestal.

4. A shampooing stand comprising a single upstanding pedestal for inclosing supply and drain pipes for water, and a basin with a central upright passage therethrough for the neck of the person to be treated, and with fastening and sustaining means at one edge of the basin in coactive relation to the pedestal and supporting the basin in offstanding relation to the pedestal with substantially all of the basin projecting to one side of said pedestal, said basin having a removable section opposite to the pedestal with a portion of the walls of the removable section constituting a portion of the walls defining the neck-surrounding opening.

5. A shampooing stand comprising a single upstanding pedestal for inclosing supply and drain pipes for water, and a basin with a central upright passage therethrough for the neck of the person to be treated, and with fastening and sustaining means at one edge of the basin in coactive relation to the pedestal and supporting the basin in offstanding relation to the pedestal with substantially all of the basin projecting to one side of said pedestal, said basin having a removable section opposite to the pedestal with a portion of the walls of the removable section constituting a portion of the walls defining the neck-surrounding opening, and the said removable section being of a width to permit the introduction of the neck of the person being treated into the neck-receiving opening in a direction substantially radial to the basin.

6. A shampooing stand including a pedestal, and a basin having a neck receiving opening to permit the head of a person to be arranged directly over the basin, said basin being also provided at one side with an integral cap fitted on the top of the pedestal so as to support the basin in a projecting position in spaced relation with the pedestal.

7. A shampooing stand comprising a pedestal, a basin supported by the same and including an outer wall and provided within the space inclosed by the said wall with a central neck receiving opening extending through the bottom of the basin and permitting the head of a person to be arranged in an upright position over the center of the basin within the space inclosed by the said outer wall, and a shampooing fixture supported by and extending upwardly from the pedestal and having a nozzle portion with a swivel connection to the pedestal, whereby the nozzle portion may be moved about the swivel connection to and from a position over the opening of the basin.

8. A shampooing stand comprising a basin including an outer wall having its upper edge arranged in a horizontal plane, and a bottom provided within the space inclosed by the outer wall with a neck receiving opening to permit the head of a person to be arranged in an upright position over the basin and within the space inclosed by the said outer wall, said basin being also provided at the neck receiving opening with an upwardly extending collar having its upper edge projecting slightly above the horizontal plane of the said outer wall, and a flexible bib arranged to encircle the neck of a person and having a portion fitted against the basin around the said collar.

9. A shampooing stand including a pedestal having a reduced upper portion forming a shoulder, and a basin having a central neck receiving opening to permit the head of a person to be arranged directly above the basin, said basin being also provided with an integral cap fitted over the pedestal and supported by the shoulder thereof.

10. A shampooing stand including a relatively rigid basin having an outer wall, and a bottom provided with a neck receiving opening extending through the bottom and permitting the head of a person to be arranged in an upright position over the basin, said basin having an entrance opening extending from the neck receiving opening to the outer wall of the basin to enable the neck of a person to pass through said entrance opening to the neck receiving opening, and a removable closure for the entrance opening extending from the neck receiving opening to the outer wall of the basin and completing the latter.

11. A shampooing stand including a basin consisting of an outer wall having a horizontal upper edge, a bottom provided with a central opening and leading upwardly from the outer wall to the said opening to a point slightly below the plane of the upper edge of the said outer wall, and a collar joining the bottom at the opening and upstanding therefrom to a level above the upper edge of the said outer wall.

12. A shampooing stand including a basin having an outer wall and provided with an interiorly arranged neck receiving collar located in substantially the same horizontal plane as the upper edge of the outer wall of the basin, the latter having an entrance opening extending from the neck receiving opening to the outer wall, a flange extending upwardly from the bottom of the basin at the neck receiving opening, and a closure for the entrance opening provided at its inner end with an upwardly extending flange forming with the first-mentioned flange an inner wall or collar which surrounds the neck receiving opening.

13. A shampooing stand including a basin having an outer wall and provided with an interiorly arranged neck receiving portion having an opening located in substantially the same plane as the upper edge of the outer wall of the basin, said basin being also provided with an entrance opening extending from the neck receiving portion to the outer wall, an inner wall or collar extending upwardly from the basin at the neck receiving opening, and a closure for the entrance opening provided at its inner and outer ends with wall sections or flanges completing the inner wall or collar and the outer wall of the basin.

14. A shampooing stand including a basin having an outer wall and provided with an interiorly arranged neck receiving opening located in substantially the same plane as the upper edge of the outer wall of the basin, said basin being also provided with an entrance opening extending therefrom to the outer wall of the basin, an inner wall extending upwardly from the basin at the neck receiving opening, transversely disposed walls located at the entrance opening and connecting the inner and outer walls of the basin, and a closure fitted on the transverse walls and covering the entrance opening.

15. A shampooing stand including a basin having an interiorly arranged neck receiving opening and provided with an entrance opening extending therefrom to the outside of the basin, the latter being also provided with inner and outer walls and having transversely disposed walls located at the entrance opening and connecting the inner and outer walls, and a closure arching the transverse walls and covering the entrance opening and provided with inner and outer flanges or wall sections completing the inner and outer walls of the basin.

16. A shampooing stand including a basin having an interiorly arranged neck receiving opening and provided with an entrance opening extending therefrom to the outside of the basin, the latter being also provided with an outer wall having a depending apron, and a closure for the entrance opening provided at its outer end with a wall section or flange completing the outer wall of the basin and provided with a depending apron flange fitting within the apron of the basin and completing the latter.

17. A shampooing stand including a basin having an interiorly arranged neck receiving opening and provided with an entrance opening extending outwardly therefrom to the outside of the basin, said basin also having an outwardly sloping portion around the neck receiving opening, and a closure for the entrance opening, said closure having oppositely inclined or sloping sides.

18. A shampooing stand comprising a pedestal having a water fixture, and a basin rigidly mounted on the pedestal at one side of and projecting therefrom and provided with an opening therethrough for receiving and surrounding the neck of the person to be treated, and the bottom of the basin being adapted to receive the water as it is discharged from the head being treated and provided with drainage means discharging through the pedestal.

19. A shampooing stand comprising a pedestal, and a basin provided with a central opening for the neck of the person to be treated and consisting of a stationary and a movable section, with the sections separable for access from the edge of the basin to the central opening and the latter being closed to access from the marginal portion of the basin when the sections are brought together.

In testimony, that we claim the foregoing as our own, we have hereto affixed our signatures in the presence of two witnesses.

SYLVESTER M. McCANDLESS.
FRANK G. McPHERSON.

Witnesses:
LOUIS M. HOFFMAN,
JAMES A. DAVIDSON.